United States Patent [19]

Backus

[11] Patent Number: 4,832,205

[45] Date of Patent: May 23, 1989

[54] VIBRATOR STRIPS WITH INCREASED SPACING SORTER

[75] Inventor: Petrus A. M. Backus, EV Venlo, Netherlands

[73] Assignee: Backus Sormac B.V., EV Venlo, Netherlands

[21] Appl. No.: 858,737

[22] Filed: May 2, 1986

[30] Foreign Application Priority Data

May 2, 1985 [NL] Netherlands .......................... 8501251

[51] Int. Cl.[4] .............................................. B07B 13/07
[52] U.S. Cl. .................................... 209/620; 198/382; 198/841; 209/539; 209/521
[58] Field of Search ............... 209/632, 661, 662, 668, 209/674, 676, 679, 521, 606, 538, 539, 540, 620, 621, 622; 198/382, 841, 594, 588, 842, 813

[56] References Cited

U.S. PATENT DOCUMENTS

| 441,890 | 12/1890 | Mitchell | 198/841 |
| 2,150,211 | 3/1939 | Edwards | 198/594 |
| 2,781,885 | 2/1957 | Taylor |  |
| 3,347,368 | 10/1967 | Mogensen | 209/674 X |
| 3,469,690 | 9/1969 | Ervin | 209/521 |
| 3,985,225 | 10/1976 | Baum et al. | 198/842 |
| 4,058,201 | 11/1977 | Etzold | 198/382 |
| 4,171,044 | 10/1979 | Rossio | 198/841 |
| 4,206,994 | 6/1980 | Silverberg et al. | 198/841 |
| 4,367,674 | 1/1983 | Boots | 209/674 X |
| 4,506,778 | 3/1985 | Kilpela | 198/382 |
| 4,546,886 | 10/1985 | Churchland et al. | 209/620 |

FOREIGN PATENT DOCUMENTS

| 897002 | 10/1983 | Belgium . |  |
| 16625 | 3/1980 | European Pat. Off. . |  |
| 2139431 | 8/1971 | Fed. Rep. of Germany . |  |
| 3340322 | 5/1985 | Fed. Rep. of Germany | 198/588 |
| 983335 | 6/1951 | France | 209/67 X |
| 434089 | 10/1967 | Switzerland . |  |
| 1164152 | 6/1985 | U.S.S.R. | 198/813 |

Primary Examiner—Johnny D. Cherry
Assistant Examiner—Donald T. Hajec
Attorney, Agent, or Firm—Birch, Stewart, Kolasch & Birch

[57] ABSTRACT

An orienting and sorting device for elongate objects includes a first conveyor surface having a plurality of parallel channel-like sections into which the objects are mechanically aligned. The first conveyor surface is divided into a plurality of transverse sections, each section being separated by a greater distance therebetween for sorting the oriented objects by size. The sorted objects are further stacked in a bin for removal from the work area.

8 Claims, 4 Drawing Sheets

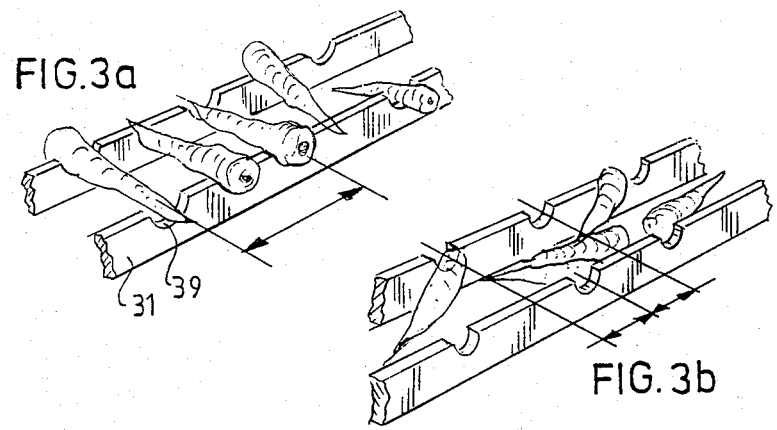
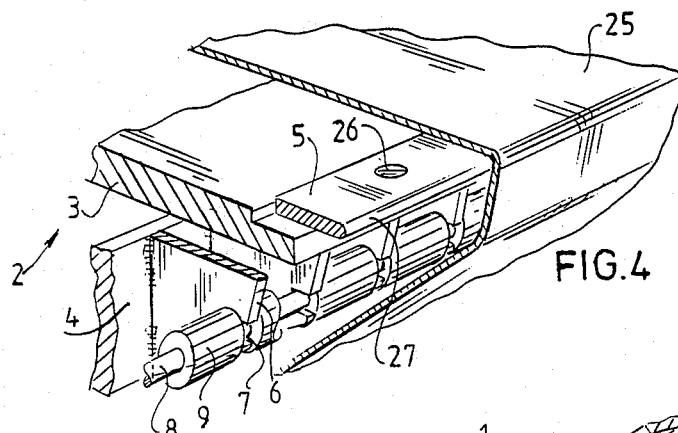
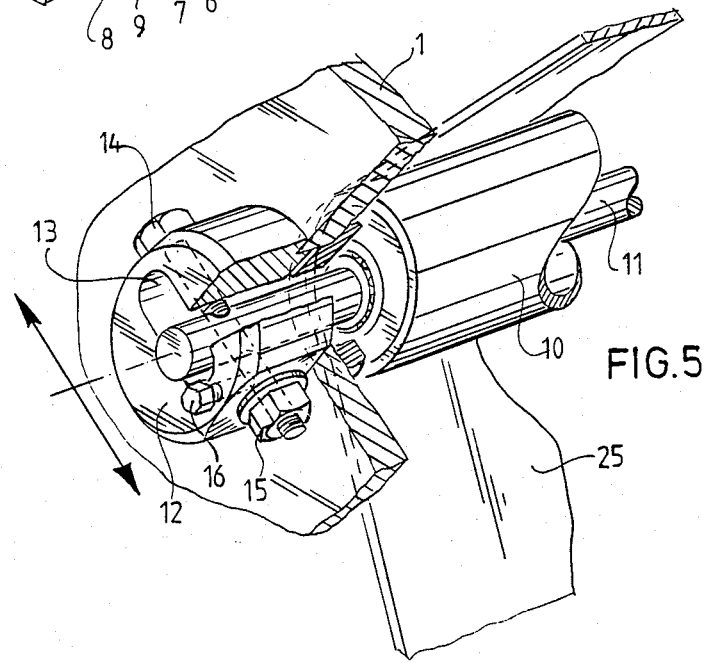

VIBRATOR STRIPS WITH INCREASED SPACING SORTER

BACKGROUND OF THE INVENTION

1. Field of the Invention

The present invention relates to a sorting device for elongate products such as carrots, consisting substantially of a conveyor surface divided in sections, having channel-like openings in a transverse direction relative to the conveyor device separating the sections, the channel width of which openings increases in the conveying direction, and means extending above the conveyor surface for orientating the articles in the conveying direction, whereby each section comprises a table having a driven endless belt carried over it.

2. Description of Related Art

Sorting takes place in such devices because the elongate products at a determined channel-like space with a predetermined width cannot pass over the space and are therefore discharged via this channel-like space. Successive widening of the channel-like openings in the conveying direction therefore results in sorting of the elongate products according to size. The problem that occurs in such devices is that the belt guiding has to be quite accurate in order to track the belt and to be able to restrict wear thereof to a minimum. Wear occurs because the belt is guided along the relatively sharp edges bounding the channel-like opening. The belt as well as the edge therefore have to consist of high quality material.

SUMMARY OF THE INVENTION

The present invention has as its aim to reduce wear by providing a device whereby the table is formed of a plate having inset parallel edge strips adjoining the channel-like openings. These inset edge strips can be very accurately processed and also made from very high quality material so that they have good resistance to wear and preserve the belt. The remaining part of the table may be of a lesser quality material, which has a favorable effect on the cost of the table.

To obtain the correct tracking of the belt it is preferable that the drive roller is arranged under the table at an interval which is more than twice the width between the edge strips. In this way a sufficient length for the belt is obtained to enable its accurate guiding so that it does not deviate sideways.

In the preferred embodiment a first and second guide roller are arranged under each blade edge strip, whereby the interval between the two guide rollers is smaller than the diameter of the drive roller. The tracking is further assured in this way because the turn-over angle around the drive roller is increased.

According to a further development of the invention the orienting means consist of a number of strips of flexible material standing on the conveyor surface, each strip being individually stretched or slackened for oscillation by a tensioning member. Thanks to the independent driving of the strips there occurs a difference in speed of movement between adjacent strips, which contributes to the correct orientation of the products.

This can be further improved by forming the upright edge strips in the initial part with notches in their upper edge to obtain an orientating impulse on the products.

The invention is elucidated further in the figure description of an embodiment following below.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 3a and 3b show a perspective view of the orienting strips above the conveyor surface in FIG. 1 taken along the arrow III in FIG. 1;

FIG. 4 shows a perspective detail view of the edge strip according to the invention;

FIGS. 5 and 6 each show a detail in perspective of the mounting and adjusting possibilities of, respectively, of the guide and turn-over rollers in the device.

DETAILED DESCRIPTION OF PREFERRED EMBODIMENTS

Figure 1:
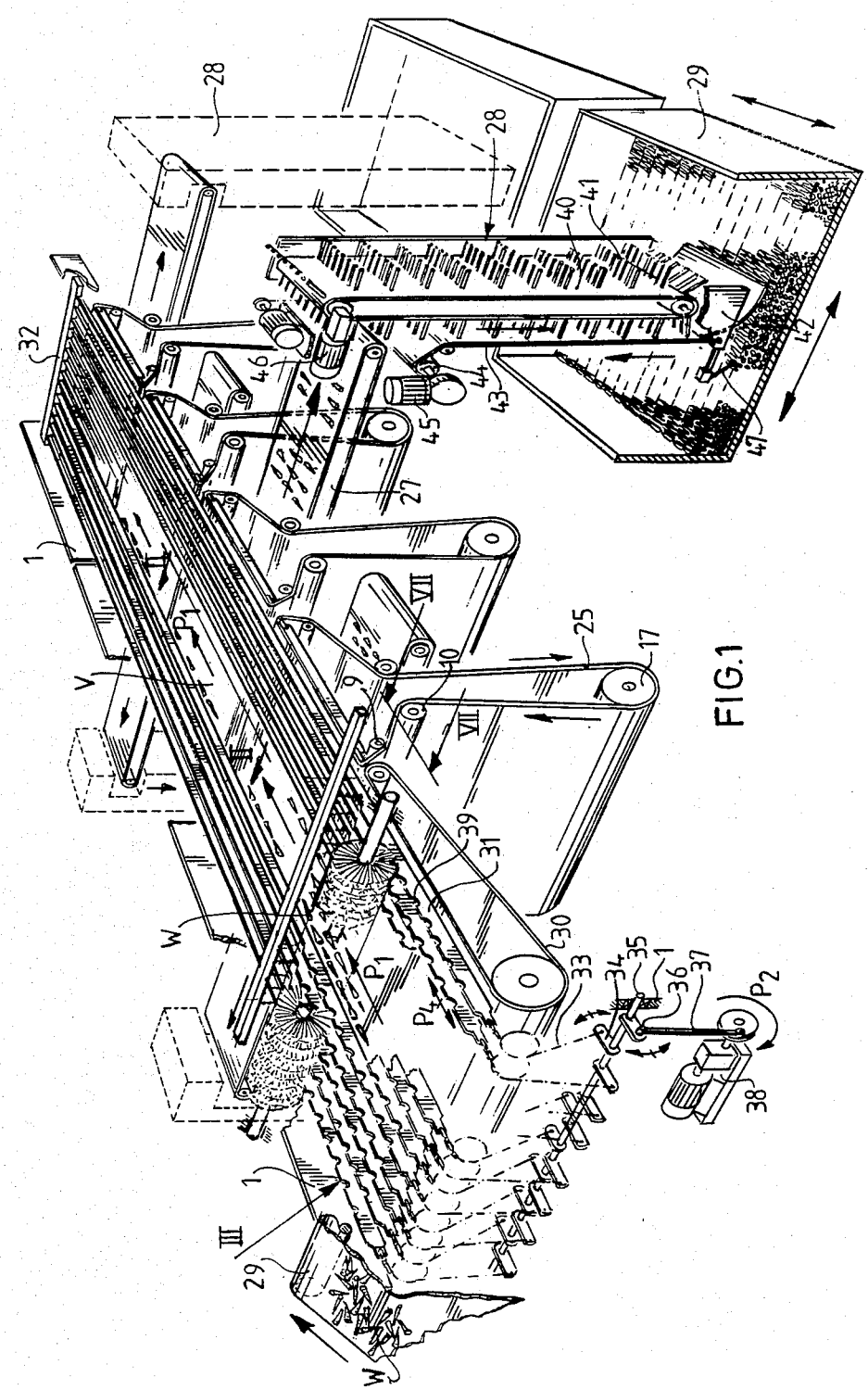
FIG. 1 shows a perspective view of the device according to the invention.

In the figures the number 1 indicates a frame constructed from plates and profiles and which is omitted on the front side for the sake of clarity in FIG. 1. The frame is sub-divided into a number of sections which, except for the first, below on the left in FIG. 1, all take the same form.

Figure 2:
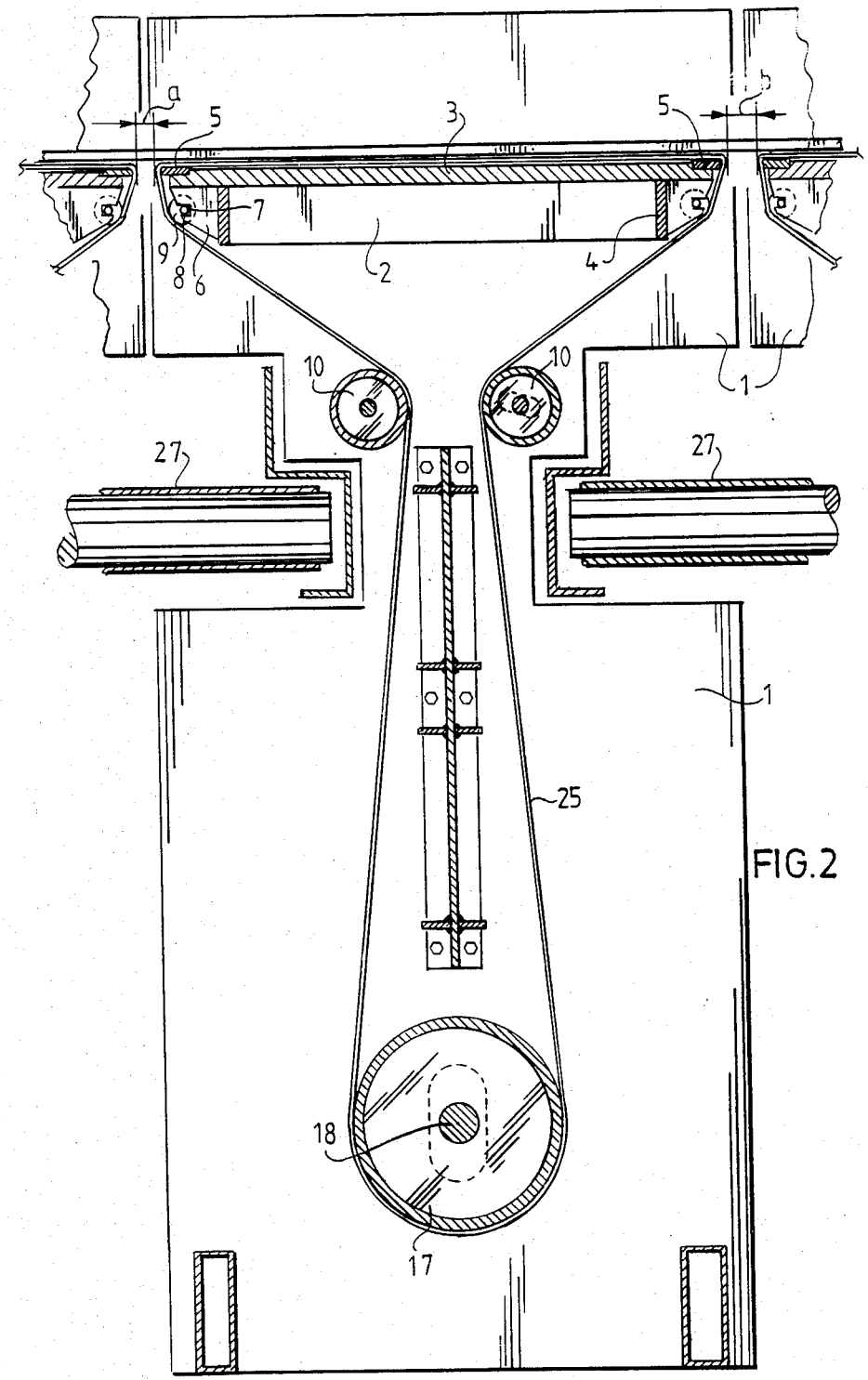
FIG. 2 shows an upright section taken along the line II—II in FIG. 1 of a section from the device.

Such a section is shown in detail on a larger scale in FIG. 2. Frame 1 supports on its upper side table 2 which consists of a flat top plate 3 and a supporting framework 4 arranged beneath it. Set in on either side of plate 3 is a blade edge strip 5, the function of which is further explained below. At the ends beneath blade edge strip 5 are arranged on the framework a number of supports 6, each provided with a slot 7 into which is mounted a shaft 8 of a guide roller 9, see also FIG. 4.

At some distance under the plate 3 of table 2 are arranged two further guide rollers 10, of which the one on the right in FIG. 2 also serves as tensioning roller. To this end the shaft 11 of roller 10 is accommodated in a bearing bush 12 attached to frame 1, this bearing bush 12 having a groove like hole 13. A screw bolt 14 is arranged through bearing bush 12, the bolt being carried through a threaded hole 15 of the shaft end 11. The bolt can be secured by means of a nut 15. Bolt 14 is additionally locked by means of a locking pin 16 which extends parallel to shaft 11 through the bearing bush.

Figure 6:
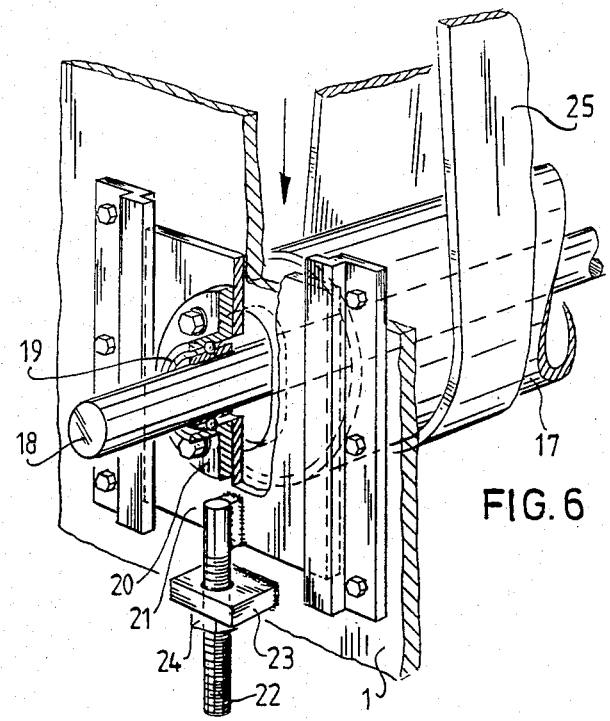

At an interval of at least twice the width of the table width 3 in FIG. 2 a turn-over/drive roller 17 is accommodated in the frame. The shaft 18 of this turn over-drive roller is driven by a motor (not shown) on the end of shaft 18, see also FIG. 6. Shaft 18 is mounted by means of a ball bearing 19 in a bearing bush 20 which is attached to a plate 21 slidable relative to frame 1. Plate 21 is formed on its underside with a threaded end 22 which is carried through an eye plate 23 attached to the frame, on the underside of which plate is arranged an adjusting nut 24. In this way the drive roller 17 can be adjusted up and down relative to the frame 1.

An endless belt 25 is flapped around the previously mentioned guide and turn-over rollers 9, 10, 17 in a manner such that a portion thereof is guided along the top of the plate 3 of table 2. By means of the above described tensioning possibilities by way of the roller 10, see FIG. 5, and the turn-over/drive roller 17, see FIG. 6, a determined tension is generated in the belt 25, ensuring a very sharp transition at the blade edge strips 5. Guide rollers 9 ensure that the tightly tensioned belt 25 remains free of the framework 4, see FIG. 4.

According to a feature of the invention, wear on the belt 25 and on the support plate 3 is prevented by to the use of the edge strips 5 whch are set into plate 3 and attached thereto by means of, for example, bolts 26. These edge strips 5 can be pre-processed very accurately such that their free edge 27 runs exactly parallel to the free edge 27 of the edge strip 5 of table 2 located opposite. A very accurate guiding of belt 25 is in this way ensured so that sideways deviations is avoided. It is remarked that edge strip 5 lies with its upper face slightly above the upper face of plate 3, so that friction between belt 25 and plate 3 is restricted to a minimum.

Wear can also be prevented by manufacturing the edge strip 5 of high quality material adapted to the high quality material of the belt 25, as a consequence of which plate 3 can be made of lesser quality material.

By placing a number of sections as according to FIG. 2 one behind the other, as can be seen in FIG. 1, there results on the upper side a conveyor surface V, whereby products for sorting, for example carrots W, are conveyed in the direction of the arrow P1, from left to right in FIG. 1. The sections are positioned behind one another at different intervals from one another, see FIG. 2, whereby on the left the interval is indicated with "a" and on the right the greater interval with "b". In this way channel-like openings occur which increase in width in the conveying direction P1. Under the channel-like openings in the conveyor surface V are arranged collecting conveyors 27 which carry away the products falling through the channel-like openings sideways to a vertically operating conveyor 28 which leads to a collecting container 29. The collecting conveyor 28 is further elucidated below.

The first section shown in FIG. 1 differs from the sections as according to FIG. 2. This is the section into which the products W are fed via a booster conveyor 29 and discharged onto an endless longitudinal conveyor 30. The upper surface of this longitudinal conveyor lies flush with the conveyor surface V, whereby the endless belt 30 of this longitudinal conveyor is also driven such that the upper part thereof moves in the direction of the arrow P1.

Along the upper conveyor surface V a plurality of upright strips 31 are arranged on lengthwise minor edges thereof over the full length of the device. These strips are firmly attached at the rear end, on the right in FIG. 1, in a transverse holder 32 which is accommodated in frame 1. At the front, on the left in FIG. 1, each strip is coupled to a tensioning member 33 which is attached to an arm 34 of a shaft 35. Shaft 35 is mounted in frame 1. In addition, shaft 35 is coupled via a connecting rod 36 to a drive rod 37 of a drive mechanism 38. The rotation of the drive mechanism in the direction of the arrow P2 causes a reciprocating movement of the connecting rod 36 and consequently of the arms 34 to which the tensioning members 33 are attached. Tensioning members 33 will therefore stretch and slacken each of the strips 31 in the directions of the arrow P4. This is possible through the correct choice of stretchable material for the strips 31.

It is noted that the upright strips 31 over the part of the first section are greater in height than the remaining part over the following sections. This elevated part is provided on the upper edge with notches 39, see also FIG. 3. These notches 39 serve to increase the grip on the products W.

Finally it is noted that, as a result of the staggered positioning of the arms 34 on shaft 35, adjacent upright strips 31 are subjected in each case to an opposing movement relative to one another.

Figure 7:
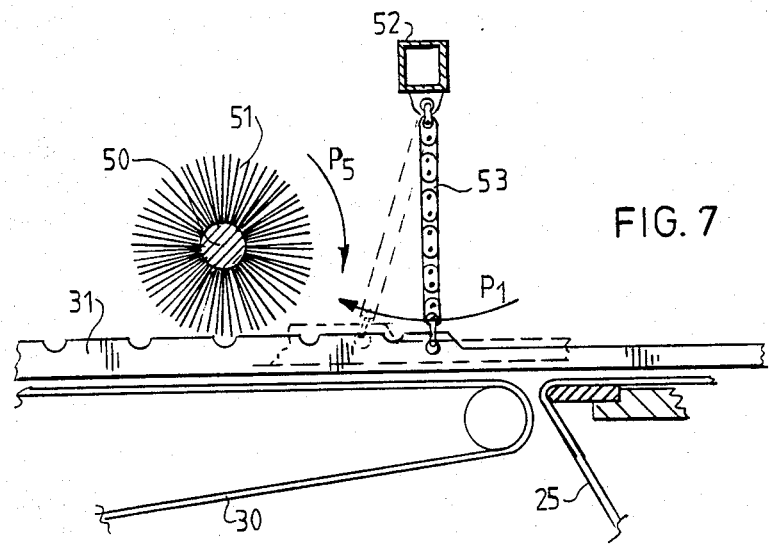
FIG. 7 shows an upright side view of a part of the device along the arrow VII in FIG. 1.

Above the first section is arranged a transverse shaft 50 which is driven by a motor (not shown). The shaft is mounted for rotation in frame 1 and carries on the portion above the upright strips 31 a plurality of brushes 51, whereby the driving of shaft 50 is such that the brushes will revolve in the direction of the arrow P5, see also FIG. 7. The brushes ensure that all the elongate articles which are orientated as according to FIG. 3a are swept between the upright strips 31.

It is furthermore noted that at the transition between the first part and the remaining part of the upright strips 31 there is arranged at some distance above the conveyor surface V a frame beam 52 on which chains 53 are suspended. Each chain is connected to the upright strip 31. As a result of the above described stretching as according to arrow P4 the point of attachment between chain and upright strip will describe a circular arc around frame beam 52, whereby the strip in each case is raised slightly from the conveyor surface, which contributes to the action of orienting the articles W between the upright strips 31.

On the right in FIG. 1 the discharge conveyor 28 is shown in detail. This consists of an endless belt 40 onto which pins 41 are attached. The pins are positioned above one another in rows, so that in each case a space is formed between them. The frame 42 in which the belt 40 is mounted for rotation is suspended from a belt 43 which is fastened firmly at the bottom to the frame 42 and at the top can be wound up onto a reel 44. Reel 44 is driven by a motor 45. The belt 40 is driven by a motor 46 which is supported in the frame 42.

On the underside of the frame 42 is arranged a sensor 47 which observes the height of the pile of products stored in the container 29. Sensor 47 controls the driving of motor 45.

The above described device operates as follows:

After the various motors have been put into operation, products W can be discharged via the booster conveyor 50 onto the first part of the conveyor surface V formed by the first section. The elongate products come to lie partly directly between the upright strips 31 and partly diagonally across them, see FIG. 3. As a result of the opposing reciprocating movement as well as the up and down movement of strips 31 and brushes 51 the products will come from the position as in FIG. 3a to lie in the position according to 3b, and then between the strips 31. This orienting action is improved by the notches 39. As soon as the products come to rest on the upper part of belt 30, they are transported to the right in FIG. 1 in the direction of the arrow P1 and come to lie on the first section as according to FIG. 2. The short products will drop directly through the channel-like space between the first and the second section onto the belt 27 lying below it, the longer products are however carried further to the following channel-like opening of greater width. A separation of the products will also take place here.

The discharge conveyor 27 carries the sorted products to the conveyor 28 where they drop onto the rows of pins 41. They are hereby held in position between the downward running belt part of belt 40 and the stationary belt 43 until they reach the lower turn-over point of belt 40 where they drop out into container 29. As soon as there is a sufficient quantity of products in container 29 the sensor 47 will send a signal to the motor 45 which then winds up the belt 43. The entire frame 42 is carried upwards and along the discharge edge of belt 27 so that an undisturbed transfer of products between both conveyors remains assured.

The invention is not limited to the embodiments described above.

I claim:

1. An orienting and sorting device for elongate objects, comprising:
   a plurality of sequential conveyor surfaces, each conveyor surface defining a conveyor section, wherein each conveyor section includes a table having a driven endless belt carried over it, said table being formed by a plate having inset parallel edge strips on opposing ends thereof, said edge strips accurately guiding said endless belt of each said conveyor surface;
   a drive roller arranged under the table at a distance of more than twice the width between the parallel edge strips for driving said endless belt in a conveying direction wherein said endless belt is wrapped around said drive roller;
   first and second guide rollers arranged under each of the parallel edge strips, whereby the distance between said first and second guide rollers is less than the diameter of said drive roller; and
   means, extending along the length of the plurality of sequential conveyor surfaces, for orienting the objects in a conveying direction;
   each said conveyor section being spaced by a predetermined distance from adjacent conveyor sections, thereby defining channel-like openings arranged in a transverse direction between and relative to each of the plurality of sequential conveyor surfaces for sorting said objects, said openings separating the sections, the channel width of said openings increasing in the conveying direction.

2. The orienting and sorting device as claimed in claim 1, further including a transverse conveyor positioned under each channel-like opening which leads to a downward operating discharge conveyor, said discharge conveyor opposing a suspended belt windable onto a driven roller,, whereby the sorted objects are dropped between said discharge conveyor and said suspended belt into a container of like-sized objects.

3. The orienting and sorting device as claimed in claim 1, wherein said means for orienting includes a plurality of strips of flexible material each positioned on a lengthwise minor edge thereof on the plurality of sequential conveyor surfaces, and wherein each one of said plurality of strips is individually stretched and slackened for oscillation in a lengthwise direction by a reciprocating tensioning member positioned at a first one of said plurality of sequential conveyor surfaces.

4. The orienting and sorting device as claimed in claim 3, wherein the reciprocating tensioning member is located relative to the conveying direction at the beginning of the first of said plurality of sequential conveyor surfaces.

5. The orienting and sorting device as claimed in claim 3, wherein the height of the orienting strips is greater at a first one of said plurality of sequential conveyor surfaces than the height of the orienting strips at the remaining ones of said plurality of sequential conveyor surfaces.

6. The orienting and sorting device as claimed in claim 5, wherein the orienting strips are provided with notches formed in the upper edge thereof only along first of said plurality of conveyor surfaces.

7. The orienting and sorting device as claimed in claim 6, wherein each of said plurality of orienting strips is suspended via a suspending member from a stationary frame beam at a last one of said plurality of sequential conveyor sections which is opposite to said first one of said plurality of sequential conveyor sections.

8. The orienting and sorting device as claimed in claim 6, further including a revolving brush positioned above and transverse to the plurality of orienting strips for sweeping objects lodged in said notches onto the conveyor surface between respective ones of said plurality of orienting strips.

* * * * *